(No Model.)

J. G. PRECOUR.
SLED BRAKE.

No. 295,195.   Patented Mar. 18, 1884.

WITNESSES
Villette Anderson.
Philip C. Masi.

INVENTOR
J. G. Precour,
by Anderson & Smith
his ATTORNEYS

UNITED STATES PATENT OFFICE.

JOHN GODFREY PRECOUR, OF REIGELSVILLE, NEW JERSEY.

SLED-BRAKE.

SPECIFICATION forming part of Letters Patent No. 295,195, dated March 18, 1884.

Application filed December 9, 1882. (No model.)

*To all whom it may concern:*

Be it known that I, J. G. PRECOUR, a citizen of the United States, residing at Reigelsville, in the county of Warren and State of New Jersey, have invented certain new and useful Improvements in Sled-Brakes; and I do declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
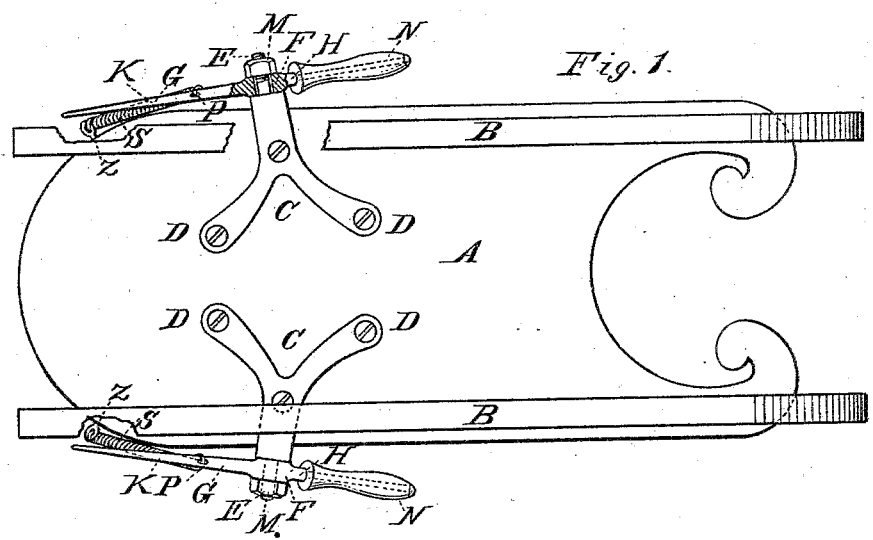
Figure 2:
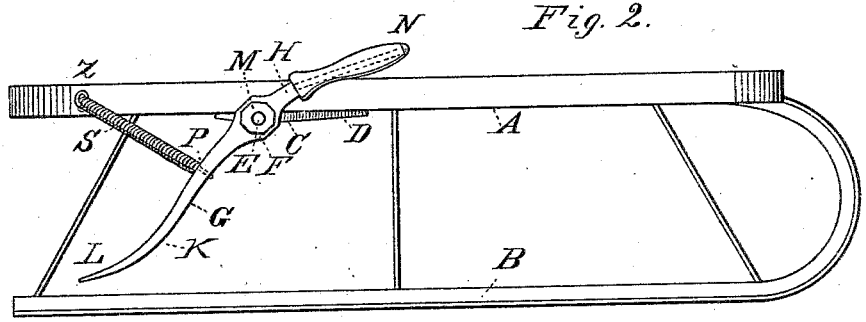
Figure 3:
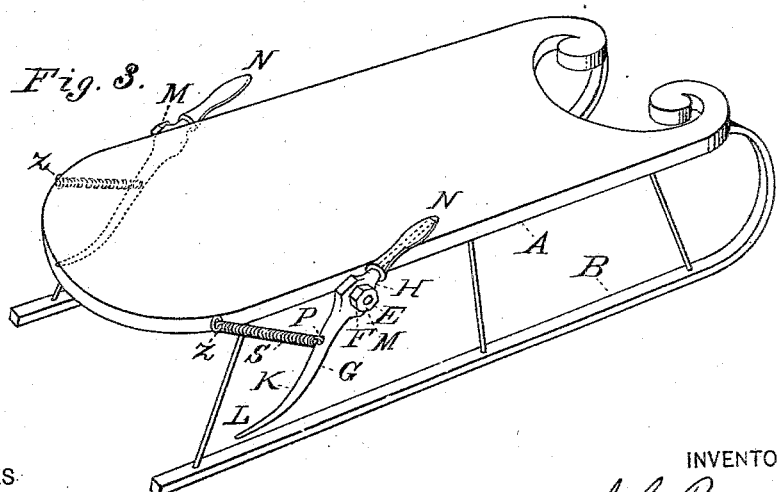

Figure 1 of the drawings is a representation of this invention, showing a plan view of the under side. Fig. 2 is a side view. Fig. 3 is a perspective view.

This invention has relation to sled-brakes; and it consists in the construction and novel arrangement of devices, as will be hereinafter fully described, and particularly pointed out in the claim appended.

Heretofore sleds have been provided with brake-levers, which have been pivoted to the sides of the sled frame or runners, the levers having at their lower ends each a downwardly-extending prong or barb, as have also been sleds with compound levers, the handle portions of which have retracting spiral springs connecting with the forward portions of the runners or frames. The former have been found objectionable in practice, as they are liable, when applying the brakes during accelerated motion, to either throw the operator from his seat to the ground or ice or turn the sled entirely over, in many cases seriously injuring the occupant. The latter is not a positive brake. It is expensive, requires experience to operate it successfully, and is exposed to many objections on account of its construction.

The present invention has for its object to obviate these inefficiencies and produce a sled-brake which will be cheap in construction, effective in operation, and durable. These objects are accomplished by the means shown and illustrated in the accompanying drawings, in which—

The letter A represents the bottom of a sled, and B the runners secured thereto.

C C indicate bracket-arms, having diverging branches D, and fastened to the sled-bottom by screws passing through the arm and branches of the bracket. The outer ends of the bracket-arms are made in journal form, as shown at E, to receive the bearings F of the brake-levers G. These brake-levers are made of metal, steel being preferred, and each lever consists of an enlarged body or bearing portion, a forward arm, H, and a downwardly and rearwardly extending arm, K, the extremity of which is curved backward, as indicated at L, to prevent the end of the lever from catching in the ice or snow. The end of the journal of the bracket-arm is threaded to receive the nut M, which serves to fasten the lever on the journal. Through the lower arm of the lever, near the bearing, is made a perforation, P, by means of which the end of an oblique retracting-spring, S, is attached to the arm. The rear end of this spring is, by means of a screw or other common fastening, secured to the body of the sled, as indicated at Z.

To the forward arm, H, is attached the handle-sleeve N, which is made of wood, in order to protect the hand from the cold surface of the metallic arm. The lower arms of the brake-levers are made gradually tapering from the bearing F to the end, so that there will be no liability to catch in the ice or snow suddenly, and thereby trip the sled over. The tension of the springs should be sufficient to hold the arms K up from the ice or snow when the sled is running free.

In order to turn the sled to one side, the handle of the brake-lever on that side is raised, causing the end of the lower arm to engage the ice or snow. To stop the sled, both levers are operated in such a manner as to check its progress, either quickly or gradually, as may be desired.

Having described this invention, what I claim, and desire to secure by Letters Patent, is—

In a hand-sled, the lateral brake-levers G, having oblique tapering spindle-form arms K, extending downward and rearward, and terminating in under convex rear extensions, L, formed without shoulder or obstruction, the forward arms, H, covered with wooden handle-sleeves N, and having the perforations P, in combination with the braced brackets C and springs S, connected each by one end to a brake-lever below its pivotal point, and by its other end to side of the body or rave in rear, all constructed and adapted to operate substantially as specified.

In testimony whereof I affix my signature in presence of two witnesses.

JOHN GODFREY PRECOUR.

Witnesses:
CHARLES HOAGLAND,
FREDERICK S. TAYLOR.